(12) United States Patent
Jones et al.

(10) Patent No.: US 8,029,007 B2
(45) Date of Patent: Oct. 4, 2011

(54) STROLLER PASSENGER ASSEMBLY

(76) Inventors: Andrew D. Jones, Jerome, ID (US);
Robin Peng, Sandy, UT (US); Ralph Sonderegger, Farmington, UT (US);
Bart Peterson, Sandy, UT (US); Kevin Kinkade, West Jordan, UT (US)

( * ) Notice: Subject to any disclaimer, the term of this patent is extended or adjusted under 35 U.S.C. 154(b) by 1494 days.

(21) Appl. No.: 10/904,996

(22) Filed: Dec. 8, 2004

(65) Prior Publication Data
US 2007/0114738 A1 May 24, 2007

(51) Int. Cl.
*B62B 9/12* (2006.01)
(52) U.S. Cl. .................. 280/47.131; 280/650; 280/656; 280/204; 280/292
(58) Field of Classification Search ............... 280/32.7, 280/43, 47.371, 47.38, 63, 64, 79.11, 79.2, 280/87.01, 202, 204, 288.4, 292, 304.5, 642, 280/647, 650, 656; 74/551.3
See application file for complete search history.

(56) References Cited

U.S. PATENT DOCUMENTS

| | | | |
|---|---|---|---|
| 5,463,853 A * | 11/1995 | Santoli et al. | 56/6 |
| 5,622,375 A * | 4/1997 | Fairclough | 280/642 |
| 5,625,923 A * | 5/1997 | Huang | 16/429 |
| 5,725,238 A | 3/1998 | Huang | 280/642 |
| 5,882,022 A | 3/1999 | Convertini et al. | 280/47.38 |
| 5,909,887 A * | 6/1999 | Hobrath | 280/32.7 |
| 5,967,190 A * | 10/1999 | Korpi et al. | 138/96 R |
| 6,098,492 A * | 8/2000 | Juchniewicz et al. | 74/551.3 |
| 6,422,634 B2 | 7/2002 | Lundh | 296/97.21 |
| 6,447,001 B1 * | 9/2002 | Hsia | 280/642 |
| 6,453,921 B1 * | 9/2002 | Rost | 135/67 |
| 6,530,591 B2 * | 3/2003 | Huang | 280/650 |
| 6,540,238 B2 | 4/2003 | Yang | 280/37.2 |
| 6,557,878 B2 * | 5/2003 | Chen | 280/226.1 |
| 6,698,772 B1 | 3/2004 | Cervantes | 280/47.35 |
| 6,827,356 B2 * | 12/2004 | Zhuang | 280/32.7 |
| 6,893,028 B2 * | 5/2005 | Smith et al. | 280/32.7 |
| 7,159,829 B1 * | 1/2007 | Finkelstein | 248/188.4 |
| 7,290,776 B2 * | 11/2007 | Pascznk | 280/47.371 |
| 2001/0033069 A1 | 10/2001 | Ivers | 280/648 |
| 2002/0135142 A1 * | 9/2002 | Hinds | 280/9 |
| 2003/0025304 A1 | 2/2003 | Haeggberg | 280/656 |
| 2003/0127835 A1 | 7/2003 | Shapiro | 280/656 |
| 2004/0164510 A1 | 8/2004 | Zhuang | 280/63 |
| 2007/0090619 A1 * | 4/2007 | Lundh | 280/63 |

* cited by examiner

*Primary Examiner* — Christopher Ellis
*Assistant Examiner* — John D Walters
(74) *Attorney, Agent, or Firm* — Geoffrey E. Dobbin

(57) ABSTRACT

The present invention is a passenger assembly for a stroller and is adaptable to almost any stroller and is capable of practice in numerous embodiments. The preferred embodiment features a chassis mounted platform with adjustable mounting arms. A mounting mechanism is located at the terminus of each arm and is attachable and removable from the stroller frame with the passenger assembly. A number of potential mounting mechanisms are disclosed. An extension handle is provided to allow users greater control of the stroller from a distance further than normal, as the assembly occupies the position proximate the stroller, where the user ordinarily stands. Modules are capable of addition to the assembly, such as a seat or basket, or a stow strap for securement of the assembly when not in use.

21 Claims, 16 Drawing Sheets

Figure 1
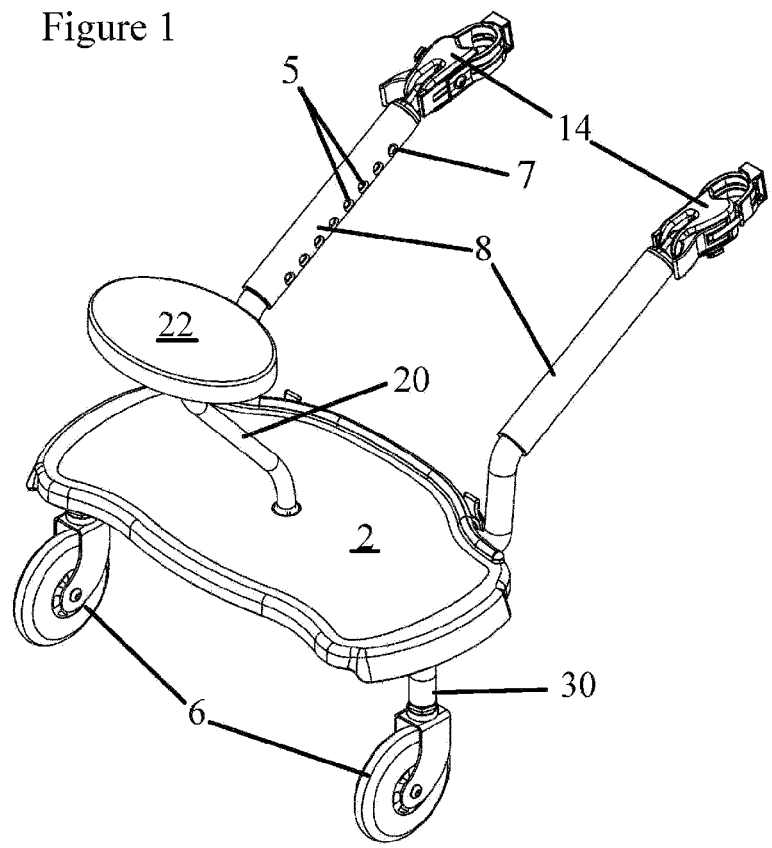
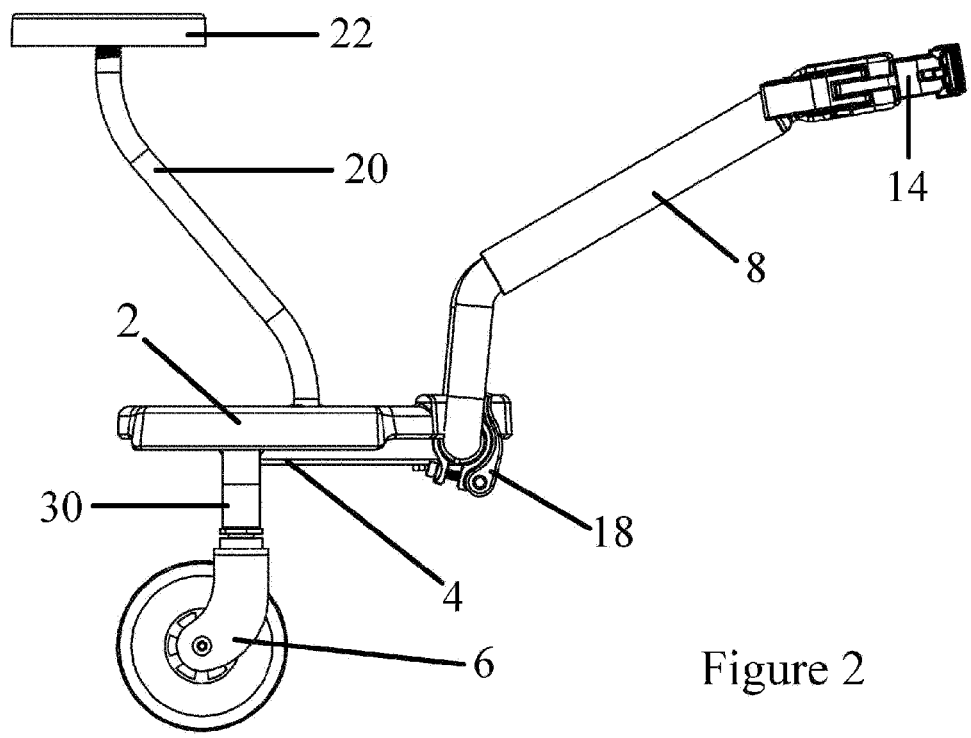
Figure 2

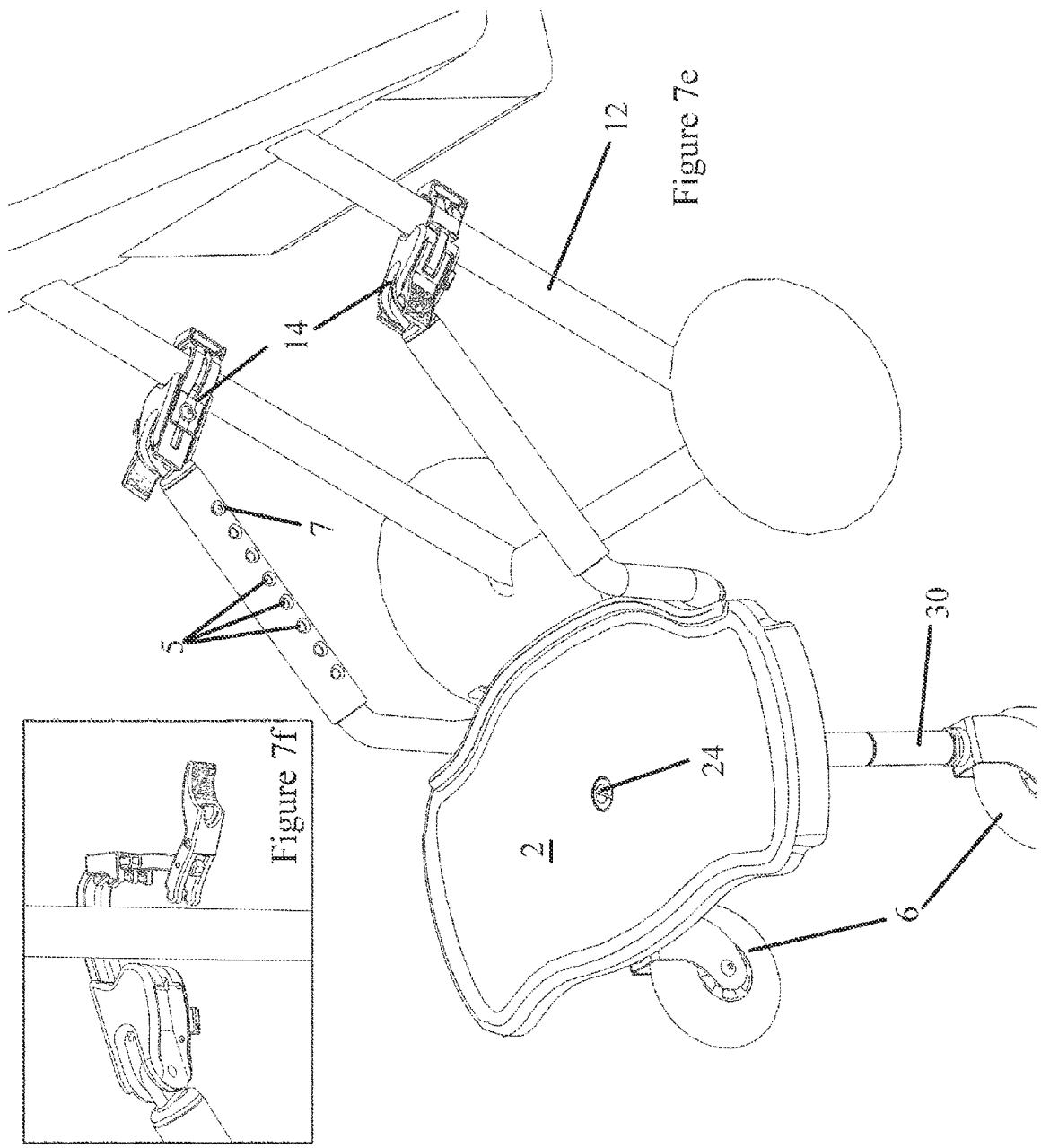

Figure 9a
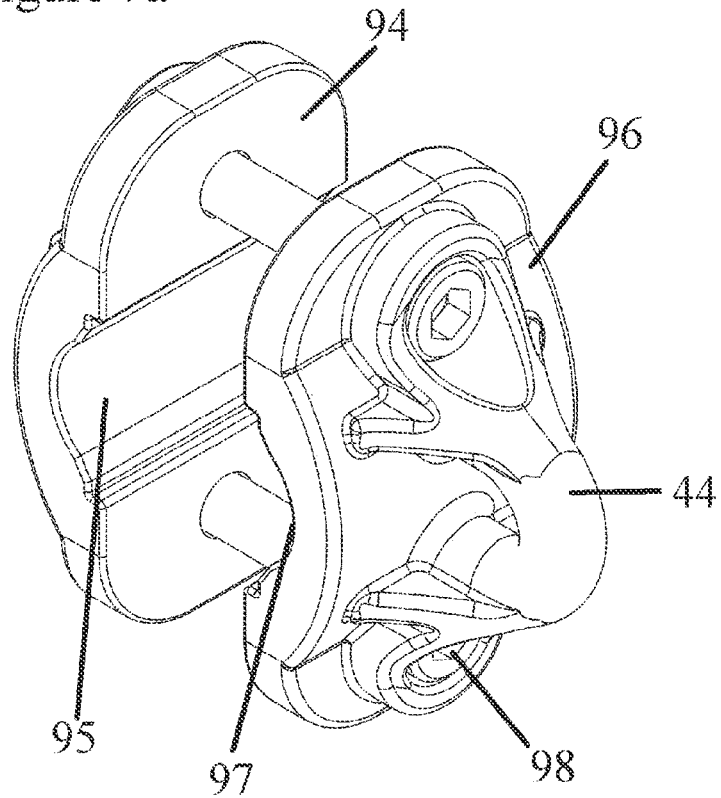
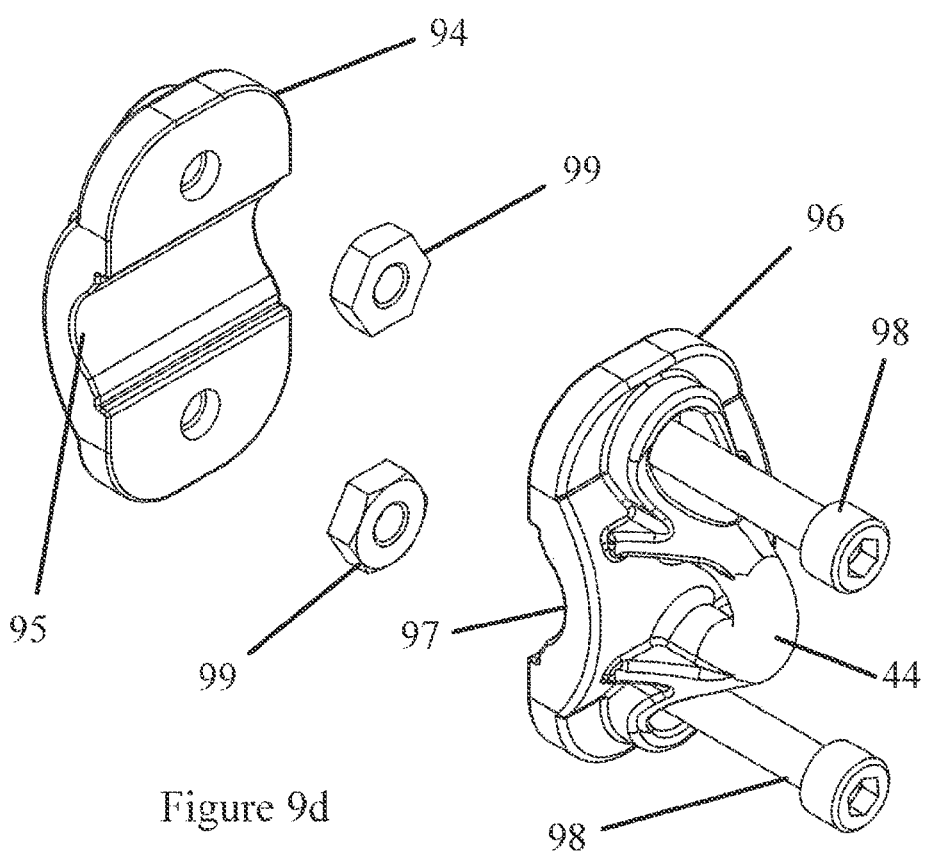
Figure 9d

STROLLER PASSENGER ASSEMBLY

FIELD OF INVENTION

The present invention relates to the field of load bearing carts, such as infant and child strollers, shopping carts and the like and more particularly relates to assemblies purposed to allow additional passengers for such strollers and carts.

BACKGROUND OF THE INVENTION

Stroller passenger assemblies are known in the prior art. They are used to provide an additional seat or platform for a child either on or attached to a stroller. Advantages of such devices are readily appreciable for households with more than one small child. However, the present state of the art lacks a stroller passenger assembly that is readily adaptable to different strollers of different types with minimal alteration to either the stroller or the assembly. Likewise, a number of passenger assemblies require mounting significant hardware on the stroller, reducing unit interchangeability.

In this respect, the passenger assembly according to the present invention departs substantially from the usual designs in the prior art. In doing so, this invention provides an adaptable passenger assembly utilizable on all types of strollers. The invention also provides such adaptability in a convenient manner, leaving no major mechanical components on the stroller and in a manner that is readily removed from one stroller and utilizable on a stroller of another type. In embodiments where a component is left on the stroller frame, it is easily removed and still adaptable to other stroller frames.

SUMMARY OF THE INVENTION

In view of the foregoing disadvantages inherent in the known types of stroller passenger assemblies, this invention provides an improved passenger assembly adaptable to almost any stroller and provides adjustments and accessories that increase utility and comfort. As such, the present invention's general purpose is to provide a new and improved passenger assembly that will provide length, height, width and pitch adjustment, additional handle extensions for the stroller handle, attachments for the platform and ease of adaptability.

In order to provide these advantages, the passenger assembly of the present invention comprises many separate components, all co-operatively employed to provide an entire system as a passenger assembly. Initially, the preferred embodiment of the passenger assembly comprises a platform, mounted upon a chassis, upon which two casters are attached. The casters may be adjustable for height. Extending outward and away from the chassis is at least one, ideally two, attachment arms for interconnecting with a stroller frame. The chassis assembly is rotatable in the preferred embodiment, thereby adjusting the position of the attachment arms relative to the platform and, consequently, the stroller frame. In the preferred embodiment, handlebar extensions are provided for easier control of the stroller given the tendency of the platform alone to obstruct a user from achieving proximity necessary for comfortable, efficient and effective control of the stroller. Modules may also be added to the platform, such as a seat or basket.

The preferred embodiment's attachment to the stroller frame allows for ease of use, security and durability. Any attachment mechanism that either is removable with the attachment arms or is easily removable from the frame in order to be transferred to another stroller may be used with the preferred embodiment.

A summary of the present invention has thus been outlined in order that the more detailed description that follows may be better understood and in order that the present contribution to the art may better be appreciated.

Many objects of this invention will appear from the following description and appended claims, reference being made to the accompanying drawings forming a part of this specification wherein like reference characters designate corresponding parts in the several views.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 1 is a perspective view of the present invention.

FIG. 2 is a side elevation of the present invention.

FIG. 7b is a side elevation of the attachment means of FIG. 7a.

FIG. 7c is a front elevation of the attachment means of FIG. 7a.

FIG. 7d is an exploded view of the attachment means of FIG. 7a.

FIG. 7e is a perspective view of the assembly, utilizing the means of FIG. 7a, attached to a stroller.

FIG. 7f is a perspective view of the assembly of FIG. 7e with the attachment means unsecured.

FIG. 8b is a rear elevation of the attachment means of FIG. 8a.

FIG. 8c is a side elevation of the attachment means of FIG. 8a.

FIG. 9a is perspective view of a third attachment means for use with the present invention.

FIG. 9b is a top plan view of the attachment means of FIG. 9a.

FIG. 9c is a rear elevation of the attachment means of FIG. 9a

FIG. 9d is an exploded view of the attachment means of FIG. 9a.

FIG. 10b is a top plan view of the attachment means of FIG. 10a.

FIG. 10c is a rear elevation of the attachment means of FIG. 10a.

FIG. 10d is an exploded view of the attachment means of FIG. 10a.

FIG. 11b is a top plan view of the handle extension of FIG. 11a.

FIG. 11c is a front elevation of the handle extension of FIG. 11a.

FIG. 11d is an exploded view of the handle extension of FIG. 11a.

DETAILED DESCRIPTION OF THE PREFERRED EMBODIMENT

Figure 3:
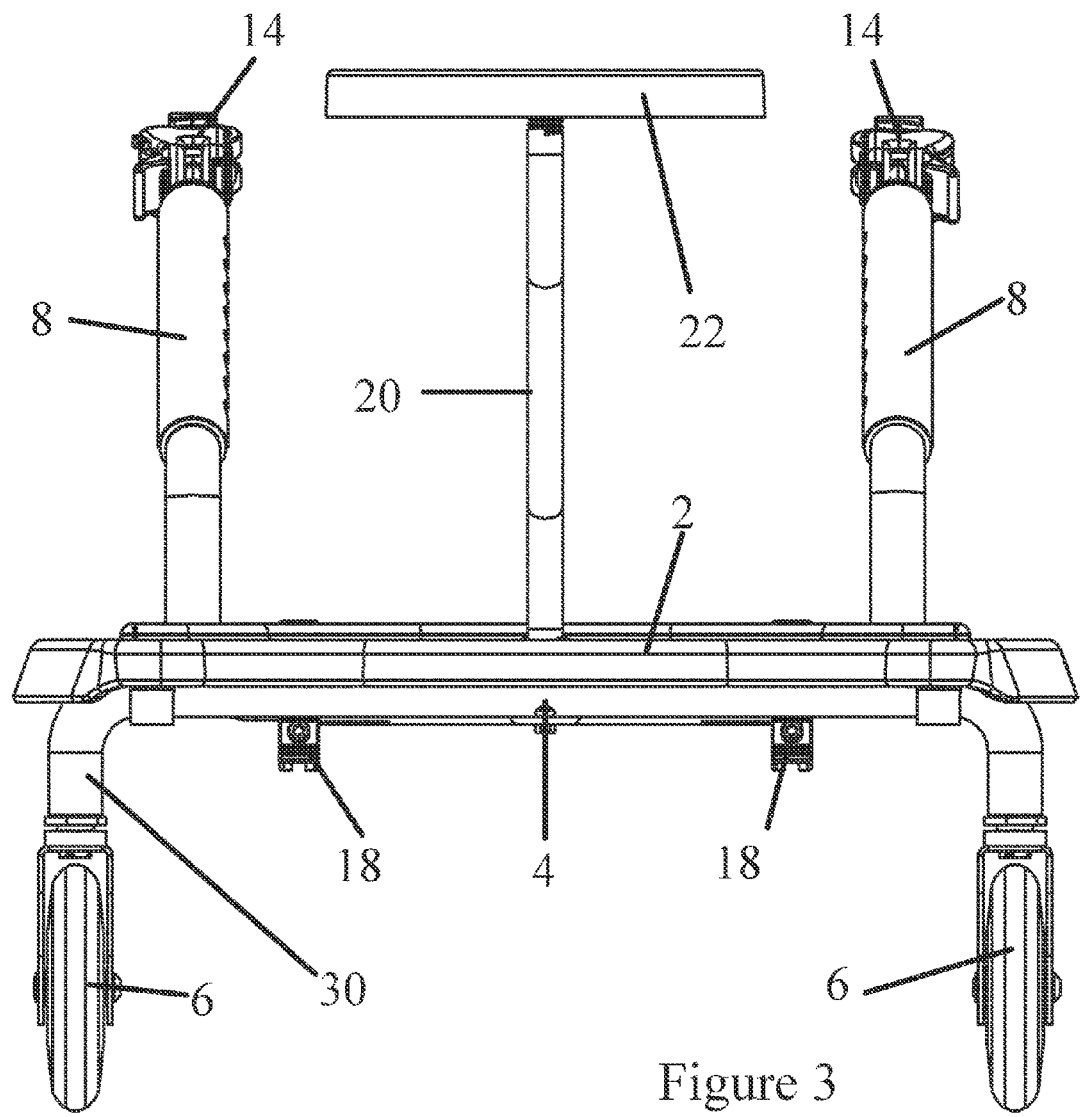
FIG. 3 is a rear elevation of the present invention.
Figure 4:
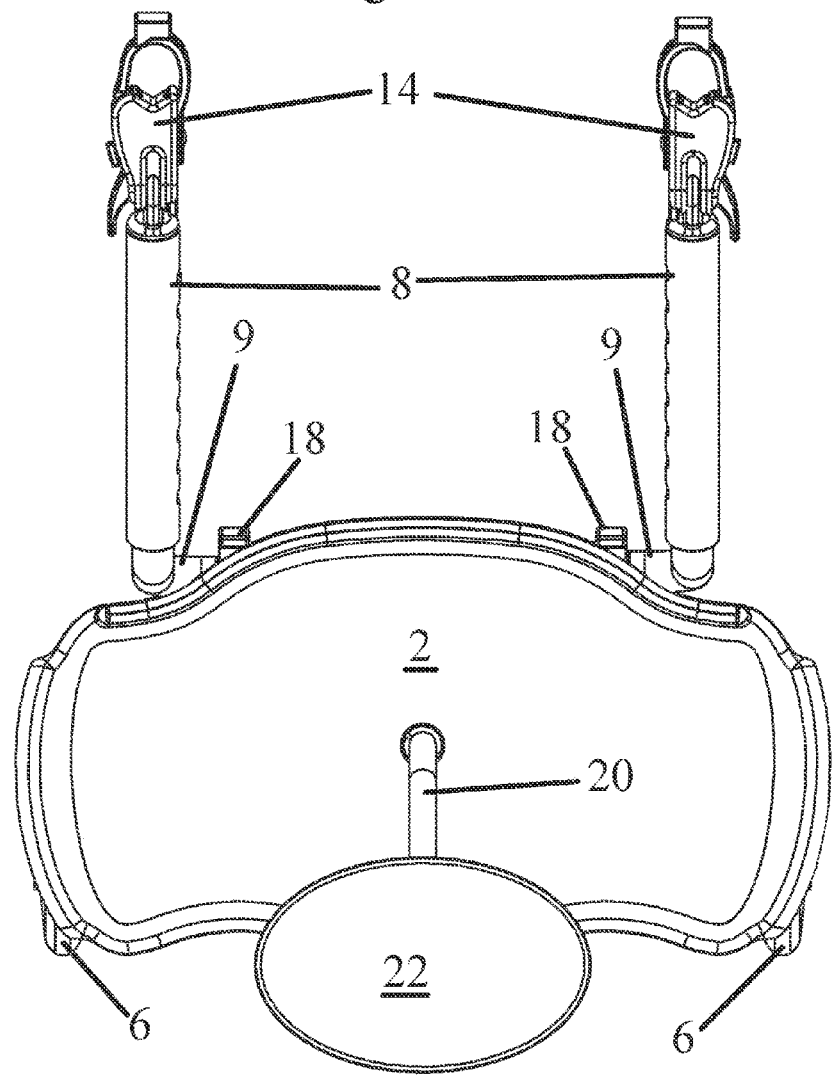
FIG. 4 is a top plan view of the present invention.
Figure 5:
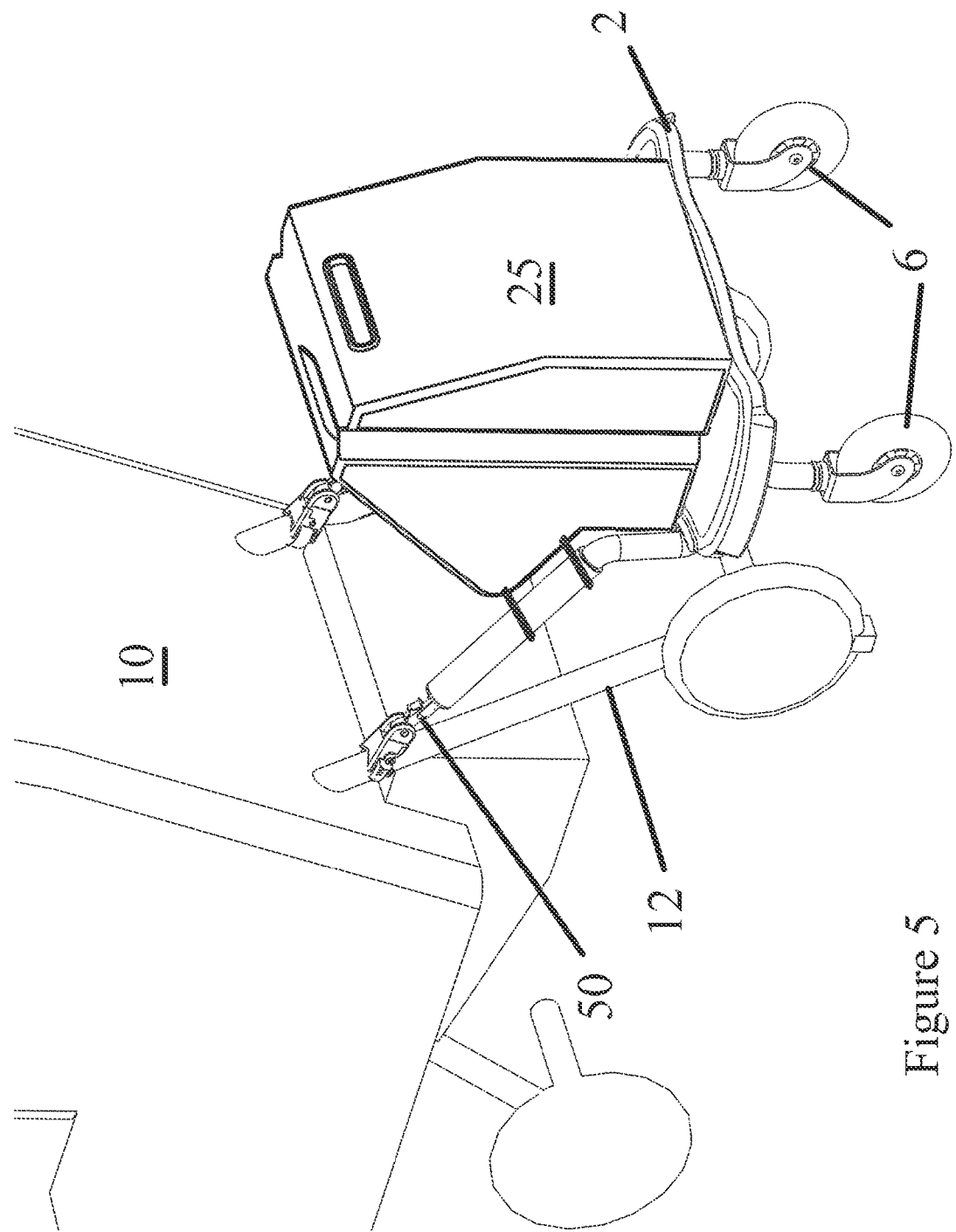
FIG. 5 is a perspective view of the assembly with an attached storage compartment.

With reference now to the drawings, and with note that as used in this specification and the appended claims, the singular forms "a," "an," and "the" include plural referents unless the content clearly dictates otherwise, a preferred embodiment of the passenger assembly is herein explained. As seen in FIGS. 1-6, in a preferred embodiment, the assembly has a platform 2 mounted upon a chassis 4 with wheels 6 extending downward from the chassis 4 for contact with the ground. Also extending from chassis 4 is at least one, preferably two attachment arms 8 for attachment to the frame 12 of a stroller 10. Attachment arms may be adjustable in length to accommodate various user preferences and stroller models. An example of a means of providing such extensible arms would be utilizing coaxially mounted tubes sliding relative to each other, incorporating a spring button latching mechanism 7 on the inner tube and several hole detents 5 on the outer tube, as depicted in FIGS. 1-6. Attachment means 14 are provided on the ends of arms 8 for attachment onto the frame 12. Ideally, attachment means 14 are easily removed from the frame 12 so as to allow for quick and easy attachment to other strollers. There are a number of embodiments for the attachment means 14 which would still come into the purview of this application and the claimed invention, some of which will be described later in this description.

In one preferred embodiment, the platform 2, being attached to chassis 4, is interchangeable with other platforms. This interchangeability allows for customization of the assembly and, if necessary, replacement of just one piece if it is damaged. The utilization of a chassis base also allows the board 2 to be adjusted into different positions relative to the chassis 4, such as a sliding relationship. Likewise, a rotational feature of the arms 8 is built into the chassis 4 to interface with said arms 8, shown in FIGS. 4 and 5. In the preferred embodiment, the arms 8 attach into the chassis 2 at an interface 16 with a compression means 18. Interface 16 is formed of two open jaws, which surround the base of the arms 9 and are closed by compression means 18. This allows a smooth 360° rotation of the arms 8, as opposed to incremental rotation. With this embodiment, the base of the arms 9 should be knurled or otherwise roughened to increase friction between it and interface 16. The chassis 4 provides greater stability and strength to the entire assembly as opposed to the use of similarly constructed platforms alone.

Figure 12:
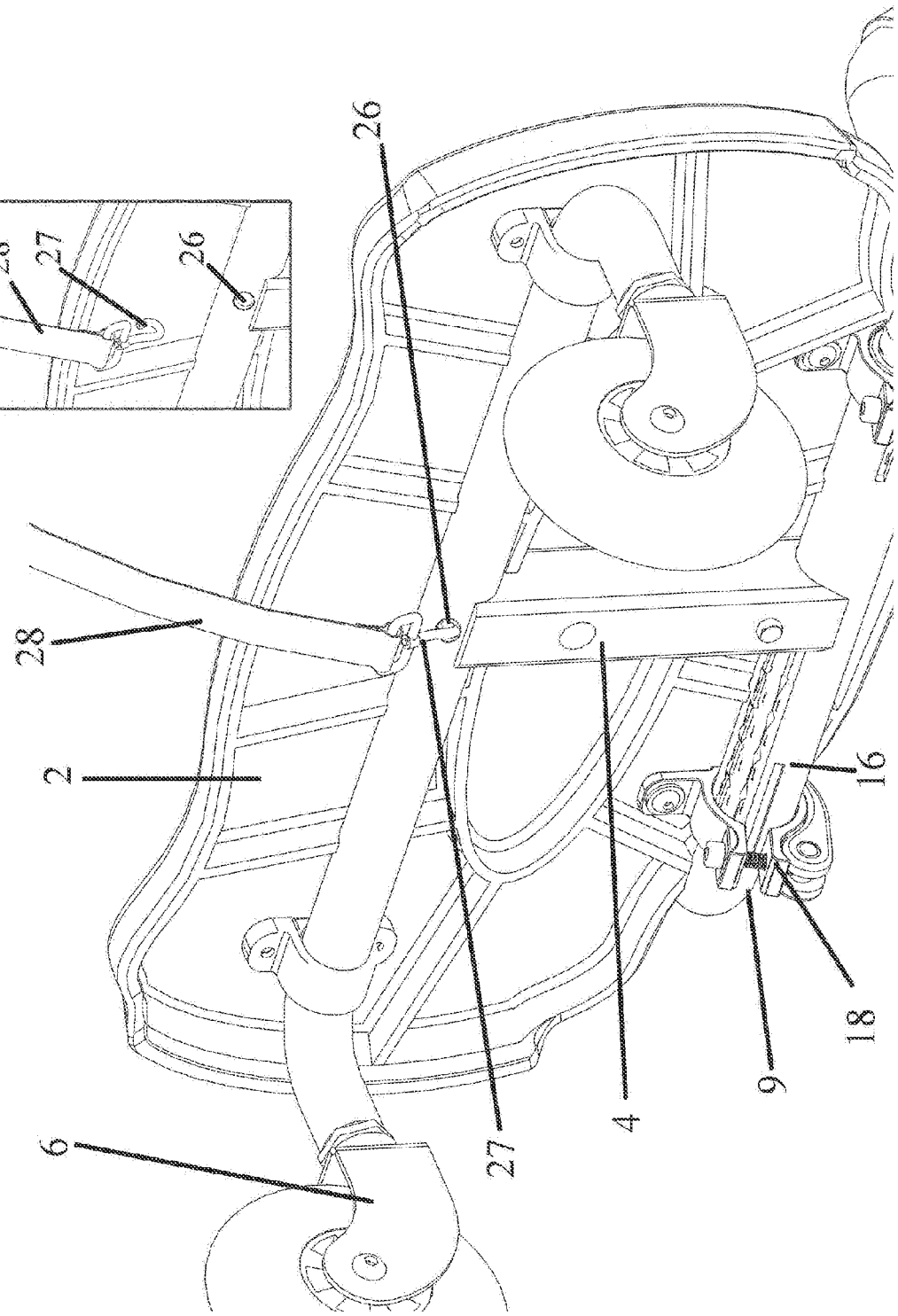
FIG. 12 perspective view detailing the underside of the assembly and stow strap in use.
Figure 12A:
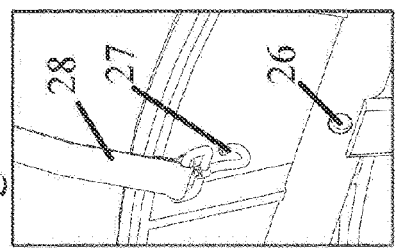
FIG. 12a is the assembly and stow strap of FIG. 12 prior to attachment of the strap to the assembly frame.

Additional features incorporated for increased utility. FIGS. 1-4 show an attachable seat structure, including a post 20 and seat 22, which preferably is screwed into a port 24, shown in FIG. 6. The seat structure may alternatively be attached through use of a bolt, clip, mesh, integral locking mechanism, snap in place, slide with detachment prevention mechanism, or any other attachment means known in the art. Alternatively, a storage compartment 25, shown in FIG. 5, may be provided for additional load bearing utility in necessary circumstances, for instance, when shopping. Stow strap 28, attached to frame 12, may also be clipped into slot 26 with hook 27, shown in FIGS. 12 and 12a and utilized to lift the assembly out of the way of a user when the assembly is not in use. Ground clearance may be raised or lowered by use of removable wheel extensions 30.

Figure 6:
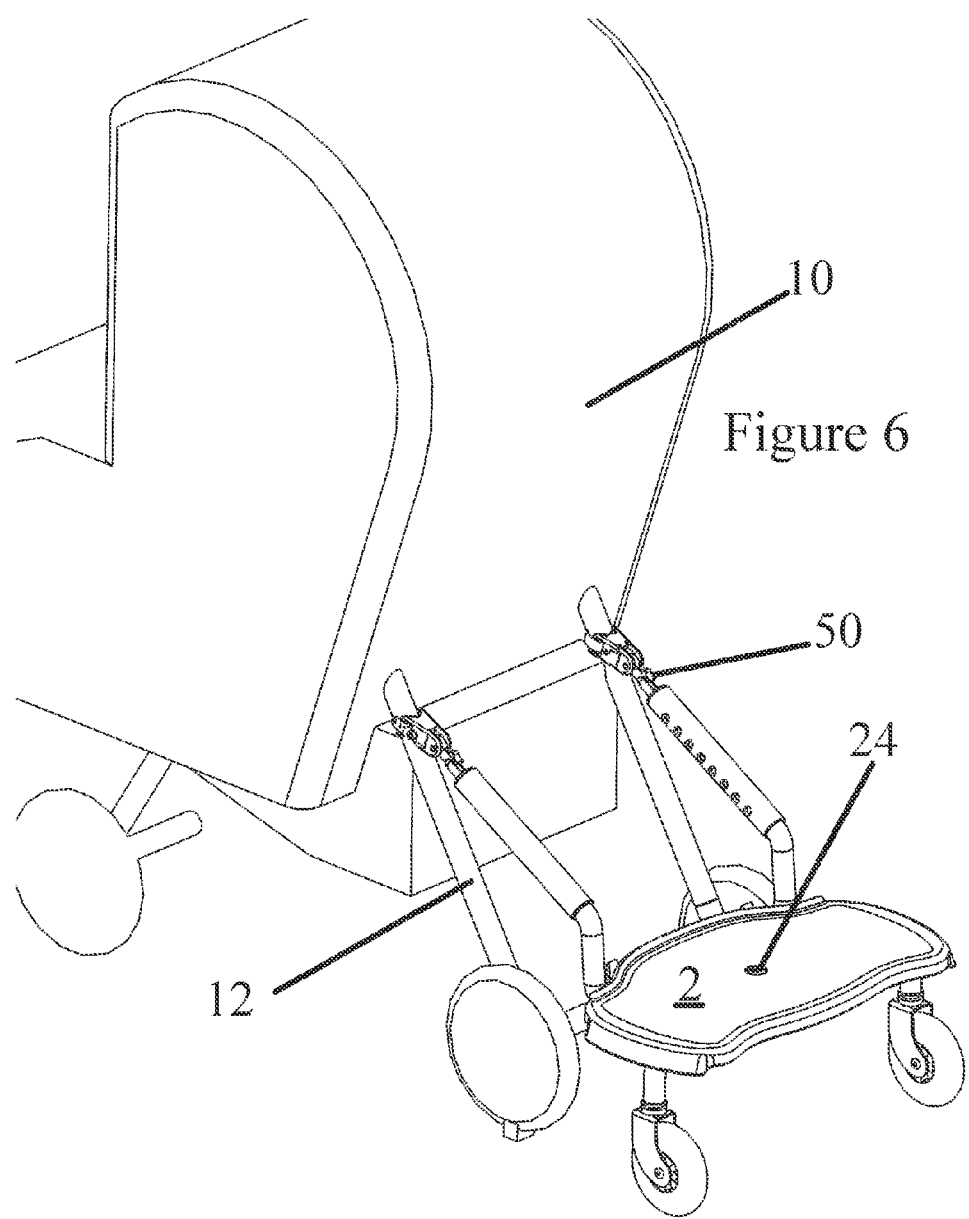
FIG. 6 is a rear perspective view of the present invention installed on a stroller utilizing the attachment means depicted in FIGS. 8a-8d.
Figure 7A:
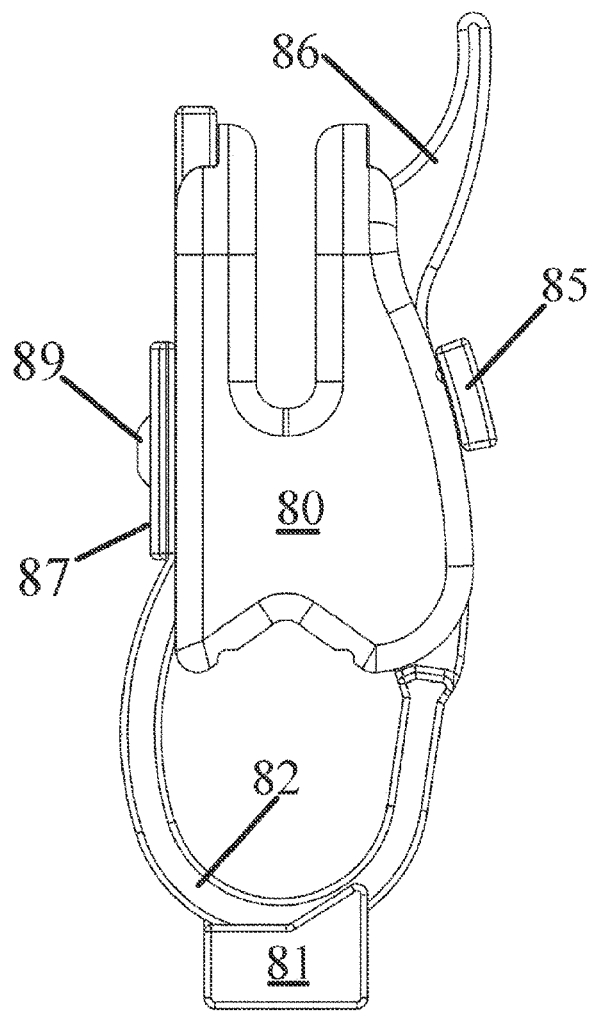
FIG. 7a is a top plan view of one attachment means for use with the present invention.
Figure 7C:
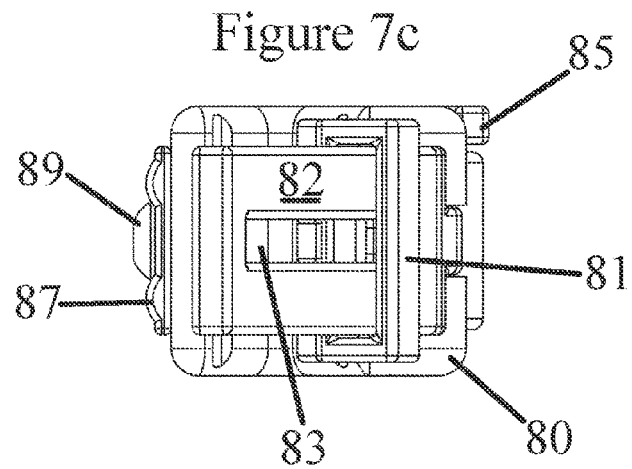
Figure 7B:
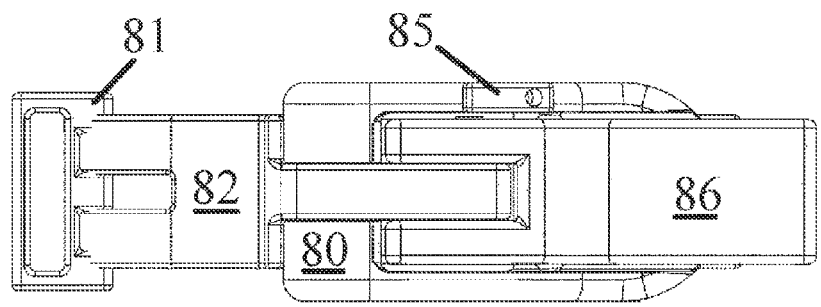
Figure 7D:
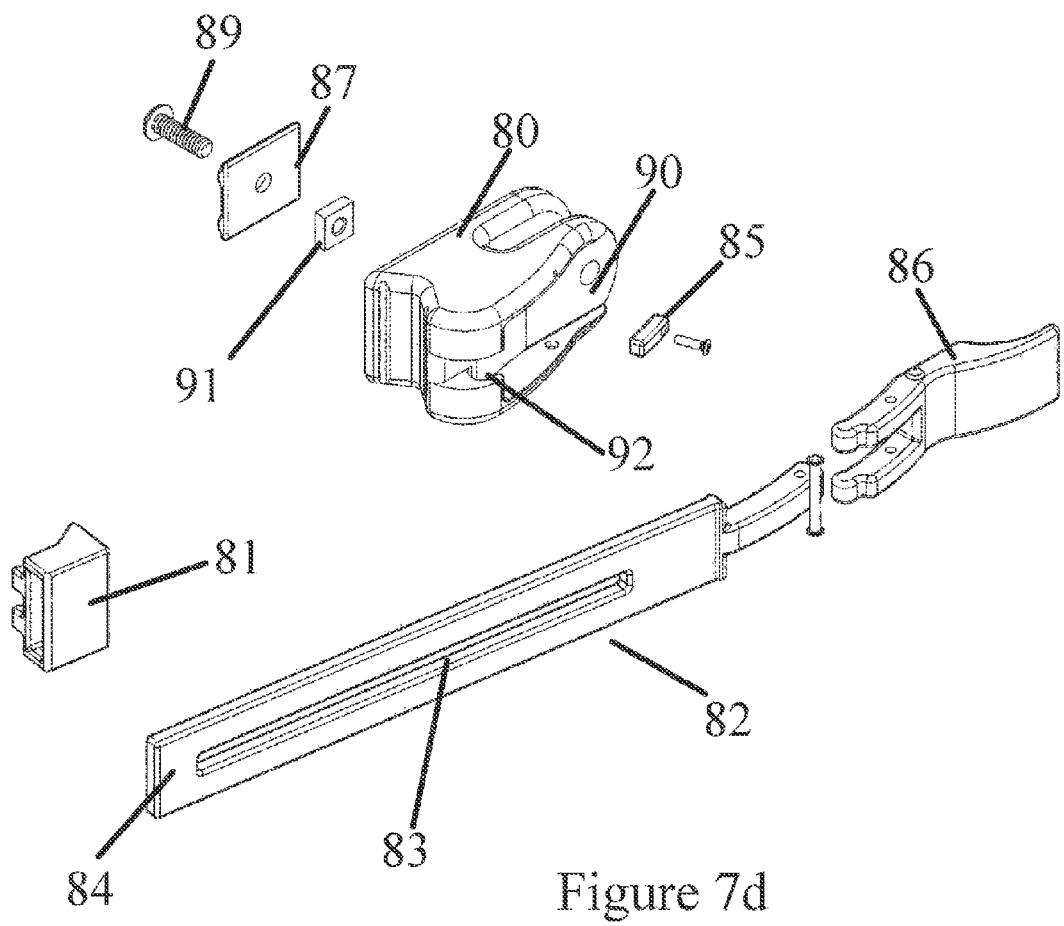
Figure 8A:
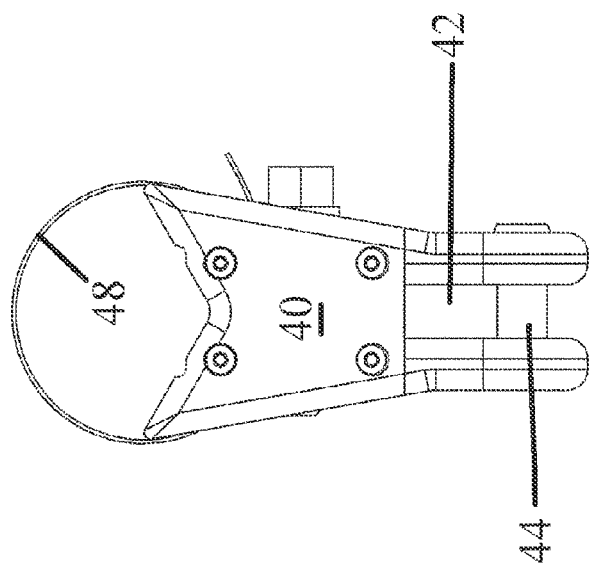
FIG. 8a is a top plan view of a second attachment means for use with the present invention.
Figure 8C:
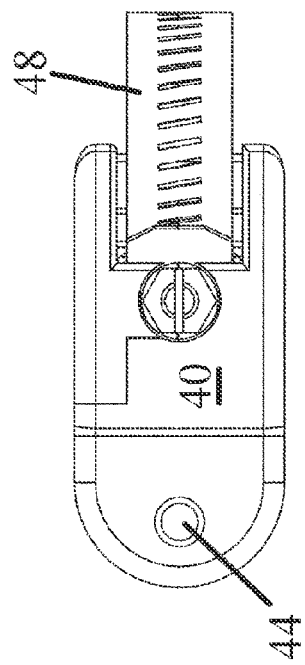
Figure 8B:
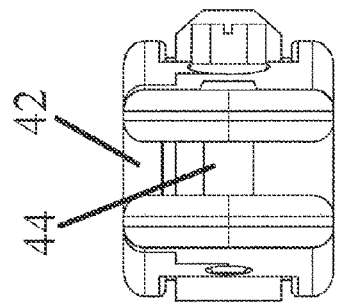
Figure 9B:
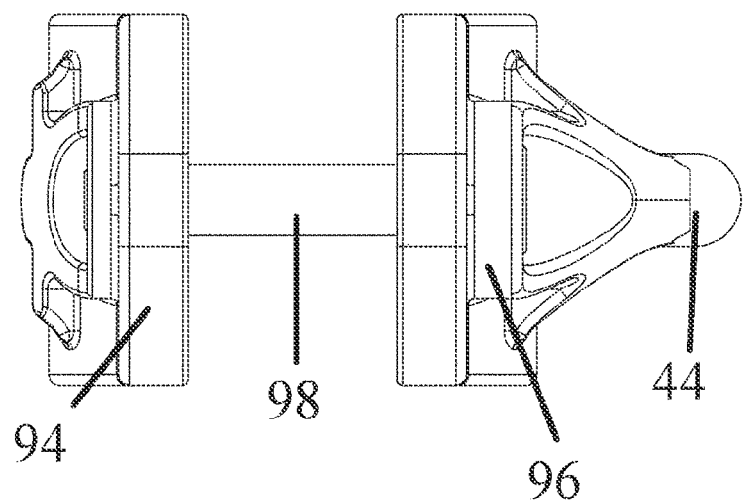
Figure 9C:
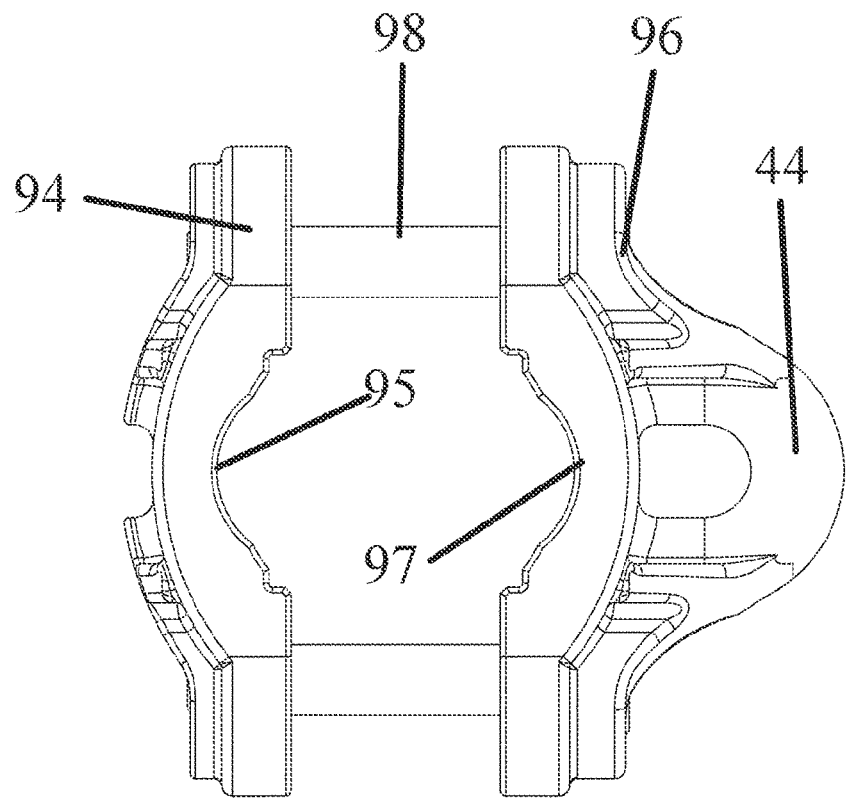
Figure 10A:
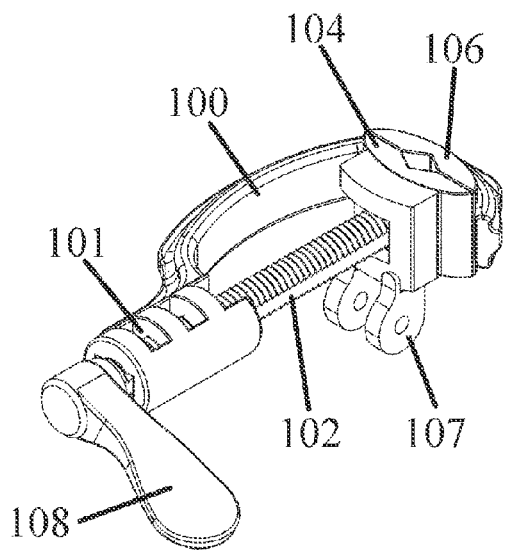
FIG. 10a is a perspective view of a fourth attachment means for use with the present invention.
Figure 10B:
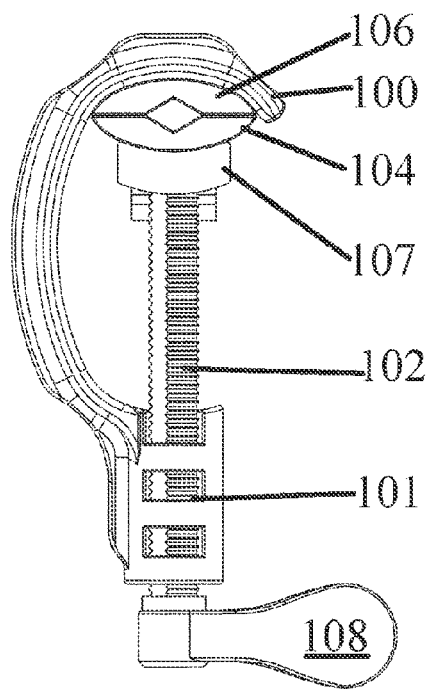
Figure 10C:
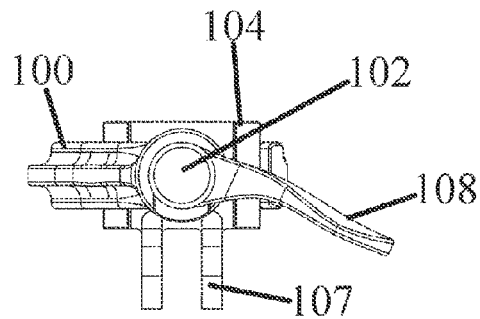
Figure 10D:
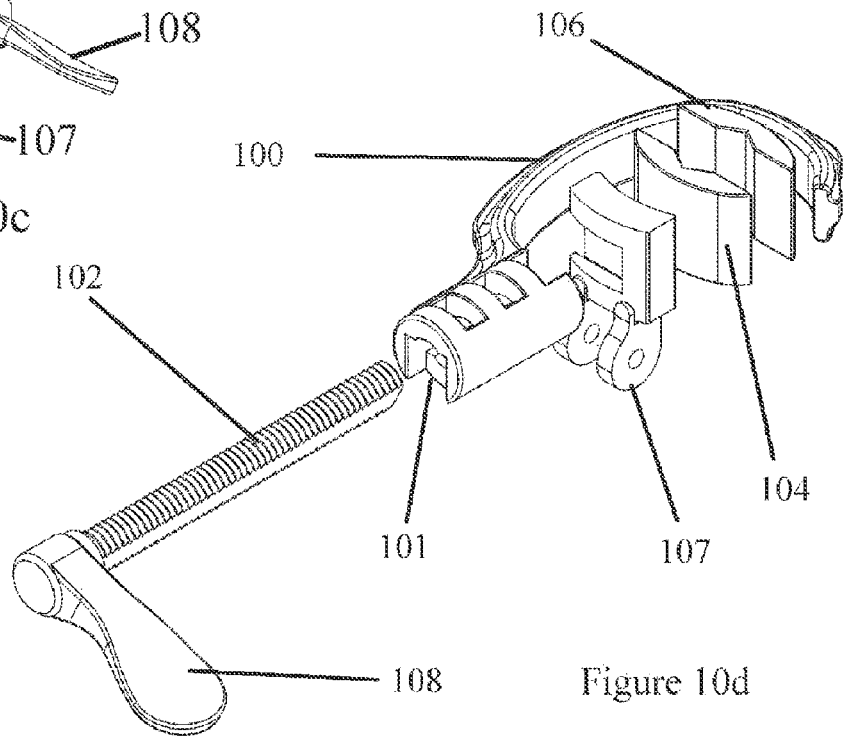
Figure 11A:
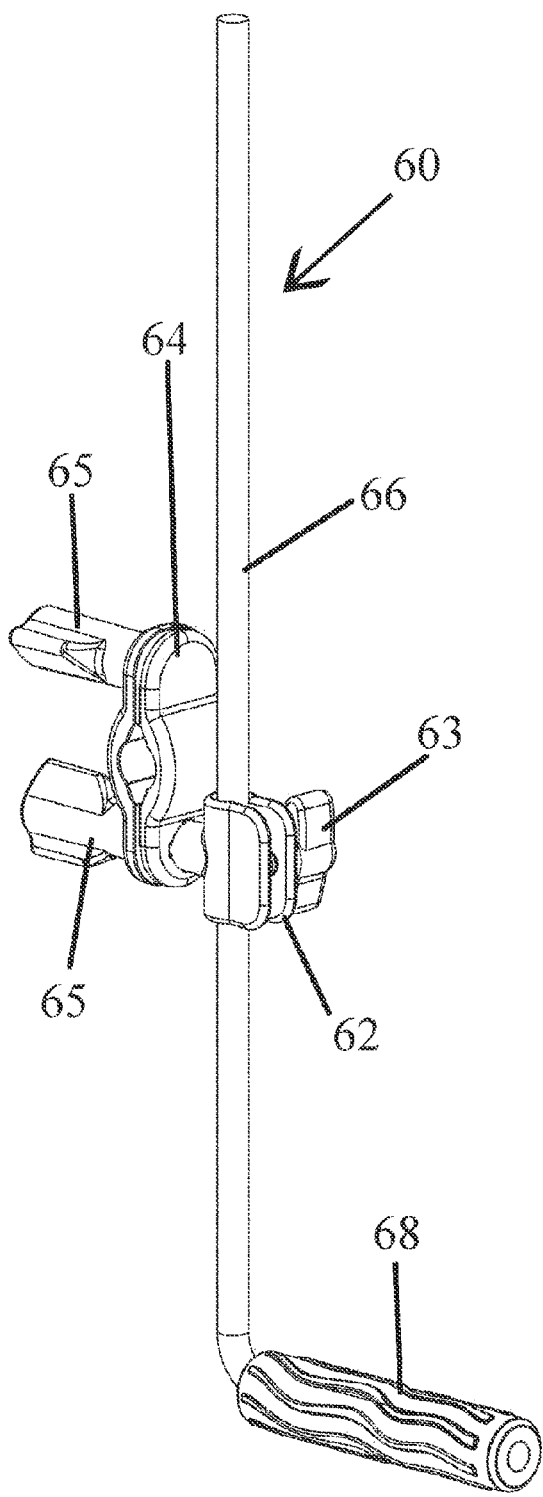
FIG. 11a is a perspective view of a handle extension for use with the present invention.
Figure 11C:
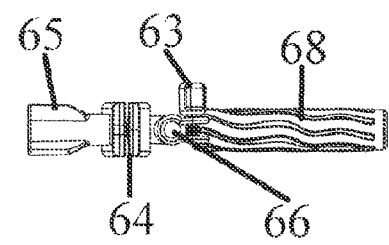
Figure 11B:
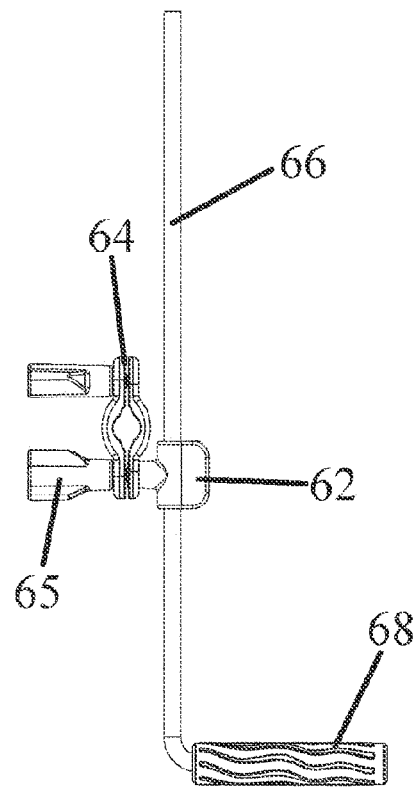
Figure 11D:
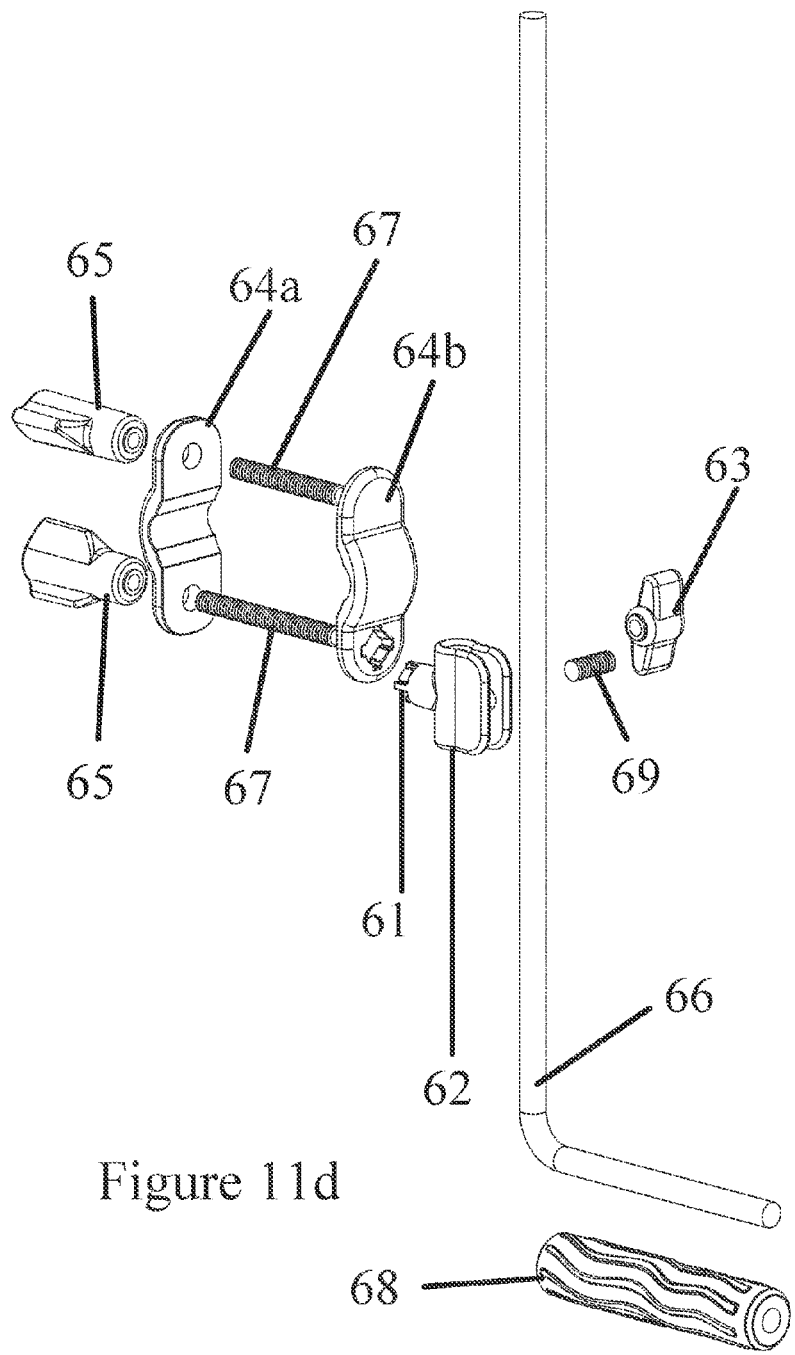
Figure 11E:
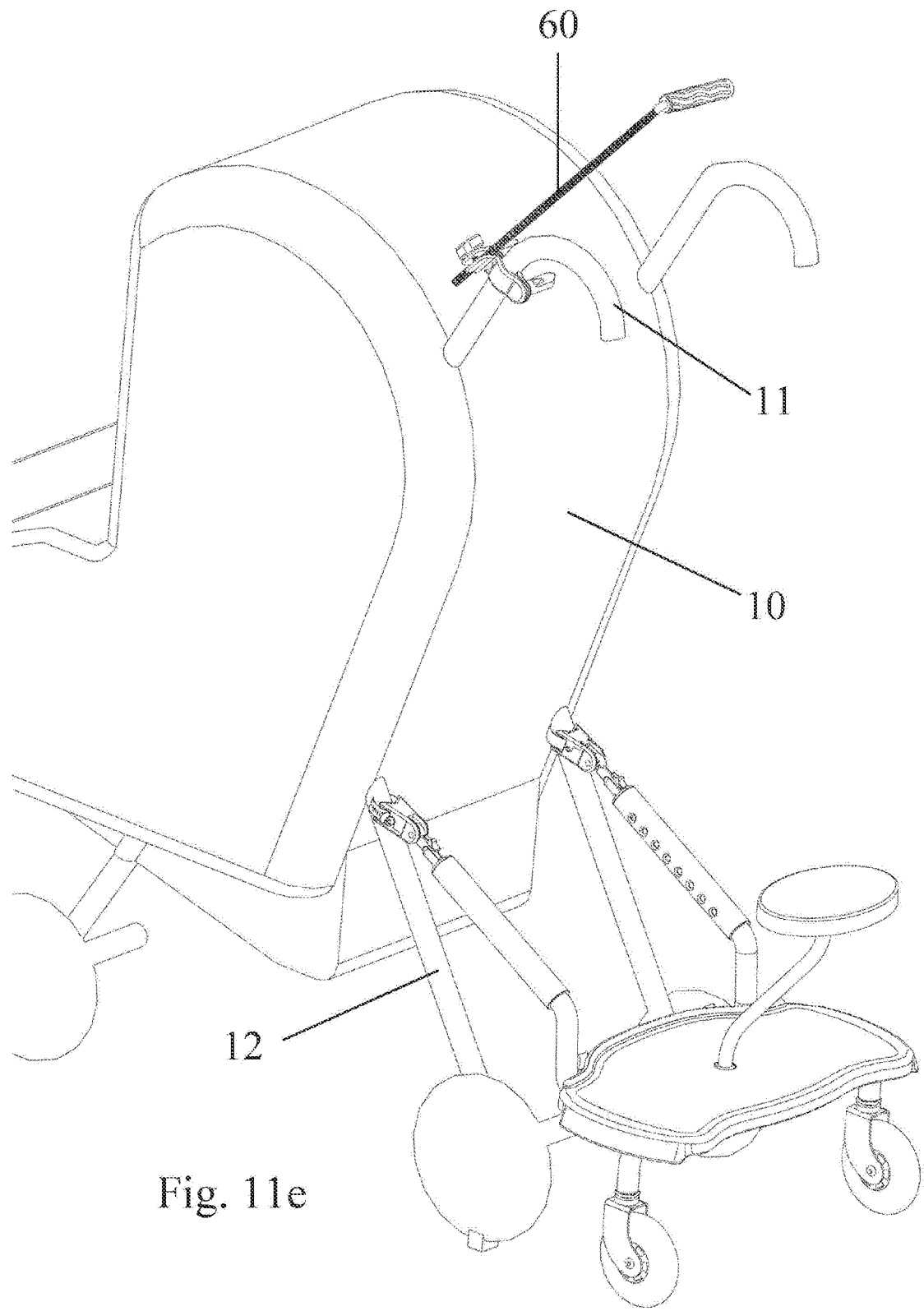
FIG. 11e is a rear perspective view of the handle extension of FIG. 11a installed on a stroller handle.

There are a number of attachment means that may be used with the present invention. The four ideal means can be categorized in two classes. The first class is a simple clip means, with an anchor semi-permanently attached to the stroller frame and a closeable hook 50 on the terminal end of the arms 8, shown in FIG. 6, for rapid attachment and detachment of the passenger assembly to and from the stroller frame. The second class is a clamping means, mounted on the arms 8, that is detachable from the stroller frame. The first attachment means, shown in FIGS. 8a-8d, is of the first class and has an anchor means defined by an anchor body 40 with a channel 42 defined centrally. Connection bar 44 bridges the channel 42 perpendicularly. Body 40 is attached to the frame 12 using the hose clamp 48 shown in FIG. 8d. Hook 50, shown in FIG. 6, is located at the end of each attachment arm 8. In use, hook 50 interfaces and closes on connection bar 44, thus attaching the assembly to the frame of the stroller.

The second means is also in the first class in that it utilizes an anchor means that attaches to the frame semi-permanently and utilizes a hook 50 to attach to the arms 8. Shown in FIGS. 9a-9d, means body has two halves 94, 96 which are brought together preferably with bolts 98. Sets of bolts 98 of varying length may be provided to accommodate different width frames. Half 96 contains connection bar 44. Halves 94, 96 should be formed with complimentary indentations 95, 97 to encompass frame 12 more securely. Halves 94, 96 may have threaded bores or nuts 99 or the like.

A third embodiment is of the second class and utilizes an adjustable clamp, shown in FIGS. 10a-10d comprising a clamp frame 100 with a threaded bore 101 and a threadingly engaged compression means 102. In this embodiment the end of both the frame and the compression means are jaws 104, 106. Lever 108 is utilized to provide additional torque on compression means 102. Between compression means 102 and jaw 104 is attachment structure 107. This attachment structure 107 may either feature a connection bar, like the previous two means, or may be attached directly to the arm 8 of the passenger assembly.

A more specialized attachment means of the second class is shown in FIGS. 7a-7d. The means includes a main body 80 and a flexible slotted strap 82 having a flaccid end 84 and a latch 86 affixed to the opposite end. The latch 86 is attached to the main body and the flaccid end 84 is wrapped around the support of the stroller frame until it is in contact with the main body 80 on the side opposite the latch. A screw 89 is passed through a brace 87 and the strap's slot 83, into a threaded bore in the main body 80, thereby allowing adjustment for different frames. Threaded nut 91 may be mounted inside main body 80 to provide a stronger threaded bore for screw 89. A locking bar 85, pivotally mounted upon the main body 80, braces the latch 86 onto the main body 80 and pivots so as to release the latch 86 and thereby the entire attachment means. Ideally, spacer 81 should have a slidable relationship on strap 82 and should be adjusted to contact the side of the frame opposite the main body 80. Main body 80 should have a depression 90 and a groove 92 to accommodate latch 86. Locking bar 85 should be sturdy enough to withstand the force of pressure from latch 86 and maintain latch's position relative the main body 80. Locking bar 85 should also be restrained from rotation unless intentionally rotated. This is easily accomplished by means known in the art, such as providing detent settings. This embodiment, as is the earlier described clamp embodiment, is well suited to a "fleet" of identical strollers, such as in a rental situation, where the assembly may be removed or installed at the whim of the user without installing a permanent part on each stroller.

For further utility, at least one extension handle 60 may be provided to account for additional space utilized by the assembly and a passenger while still enabling control of the stroller. FIGS. 11*a*-11*e* detail one possible embodiment of an extension arm with both extensibility and rotation capability. The extension handle is mounted upon the stroller handle by clamping bracket halves 64*a*, 64*b* on the stroller handle by use of bolts 67 and nuts 65. A secondary jaw 62 is mounted within half 64*b* over bolt 67 and is rotatable. Secondary jaw 62 may have detent interfaces 61 to limit rotation positions and provide a greater degree of stability when the unit is installed, or may have no such detents and rely on the tightening of bracket 64 to secure the jaw and provide greater incremental rotational control. Handle bar 66 is inserted inside secondary jaw 62 and secured with locking bolt 69 tightened by locking nut 63. Grip 68 is positioned on the end of handle bar 66 for comfort and a better gripping surface. Handle 60 is shown installed on a stroller handle 11 in FIG. 11*e*.

Although the present invention has been described with reference to preferred embodiments, numerous modifications and variations can be made and still the result will come within the scope of the invention. No limitation with respect to the specific embodiments disclosed herein is intended or should be inferred.

What is claimed is:

1. A passenger assembly for a stroller, said stroller having a frame with a handle, comprising:
   a. a passenger platform having at least one wheel;
   b. a chassis removably mounted to said platform, said chassis comprising support means for the platform, at least one wheel distally disposed to the support means, and a clamp operably coupled to a compression means;
   c. two attachment arms extending perpendicularly from a common handle base, said handle base having a knurled surface, such that they are parallel to each other, being adaptable to different positions relative the platform and chassis, the attachment arms being removably attached to the chassis at the handle base by the clamp whereby the clamp is actuated by the compression means onto the knurled surface;
   d. at least one attachment mechanism, each one affixed to a terminal end of each attachment arm adjustable to different positions and configurations so as to interface with stroller frames.

2. The passenger assembly of claim 1, wherein at least one attachment arm is extendable.

3. The passenger assembly of claim 2, wherein at least one attachment arm further comprises:
   two coaxial tubes, an outer and an inner, engaged such that sliding motion occurs along a shared axis;
   a plurality of lock bores positioned linearly along a side of the outer tube; and
   a spring loaded button positioned on a circumferential wall of the inner tube;
   wherein the button engages the bores in the outer tube as the inner tube slidingly interfaces within the outer tube along the shared axis, thereby arresting relative motion of the tubes.

4. The passenger assembly of claim 1, further comprising at least one extension handle, said handle being attachable to the handle of a stroller.

5. The passenger assembly of claim 4, wherein at least one extension handle is rotatable about an axis on the stroller handle and adjustable in length.

6. The passenger assembly of claim 1, wherein at least one caster is variable in height.

7. The passenger assembly of claim 6, wherein at least one castor is threadingly engaged to the chassis.

8. The passenger assembly of claim 7, further comprising a castor extension tube, said tube further comprising:
   a cylindrical body with a first and a second end;
   a threaded bolt projecting from the first end;
   a threaded bore on the second
   wherein, the castor and chassis threadingly engage the castor extension tube via the threaded bolt and threaded bore.

9. The passenger assembly of claim 1, further comprising a seat, mountable on the platform, which is removable therefrom.

10. The passenger assembly of claim 9, wherein the seat comprises a support surface and a support beam, said support beam having a first and second end, the first end removably attached to said support surface, and the second end being threaded to interface a correspondingly threaded socket on the platform.

11. The passenger assembly of claim 1, further comprising a basket, mountable and removable from the platform.

12. The passenger assembly of claim 1, the attachment mechanism comprising:
   a hook mounted on the terminal end of each mounting arm; and
   a mount body, semi-permanently connected to the stroller frame, said body having an exposed post providing a connection point for the hook;
   wherein, the hook interfaces with the post in order to connect the assembly to the stroller frame.

13. The passenger assembly of claim 12, the mount body further comprising:
   two complimentary clamp halves; and
   a plurality of bolts connecting the two halves
   wherein the two halves are clamped about the frame of the stroller and tightened with the bolts and one half presents the post for connection.

14. The stroller assembly of claim 12, the mount body further comprising:
   a main body, presenting the post for mounting; and
   a threadable and tightenable securement means;
   wherein the securement means is threaded around the stroller frame and tightened, thus securing the mount body to the frame.

15. The passenger assembly of claim 1, the attachment mechanism further comprising:
   a main body having a threaded bore on one side;
   a threaded compression means engaging the main body at the bore;
   a first jaw mounted on an end of the compression means;
   a second jaw mounted on an end opposite the bore on the main body;
   an attachment means; and a torque lever mounted on an end of the compression means opposite the first jaw;

wherein, the jaws are mounted such that they are biased opposite each other about the stroller frame and the attachment means is attachable to the at least one assembly arms.

16. The passenger assembly of claim 15, the attachment means being a post and the at least one assembly arm terminating in a hook attachable to the post.

17. The passenger assembly of claim 1, the attachment mechanism comprising:
- a main body
- a lever pivotally mounted upon said body;
- locking means operably associated with the lever;
- a flexible securement strap, one end operably attached to the lever;
- a space retaining means threadingly engaged to the strap;
- a securement plate located on a side of the body opposite the lever; and
- securement means to attach an other end of the strap and securement plate to the opposite side of the body;

wherein the strap is adjustably measured to fit around the frame of the stroller and secured to the body with the locking plate and means, thereby allowing the attachment mechanism to be secured and unsecured to the stroller frame by actuating the lever and locking mechanism.

18. The passenger assembly of claim 1 further comprising an extension handle attachable to a handle of the stroller.

19. The passenger assembly of claim 18, the extension handle further comprising:
- a grip;
- a handle bar upon one end of which the grip is mounted;
- a jaw interfacing along the handle;
- a handle bar securement means;
- two clamp halves, the first of which being attachable to the jaw;
- a plurality of bolts positioned between the clamp halves in a manner to draw the halves together about the stroller handle; and
- tightening means for each bolt;

wherein the handle bar is in a slides in relationship with the jaw and the jaw is in a rotational relationship with the first clamp half.

20. The passenger assembly of claim 19, the jaw and first clamp half having detent settings to limit rotational increments.

21. The passenger assembly of claim 1, the attachment mechanism further comprising:
- a main body having a threaded bore on one side;
- a threaded compression means engaging the main body at the bore;
- a first jaw mounted on an end of the compression means;
- a second jaw mounted on an end opposite the bore on the main body;
- an attachment means; and
- a torque lever mounted on an end of the compression means opposite the first jaw;

wherein, the jaws are mounted such that they are biased opposite each other about the stroller frame and the attachment means is attachable to the at least one assembly arms.

* * * * *